United States Patent
Painter

[11] B 3,984,634
[45] Oct. 5, 1976

[54] ANTI-MULTIPATH DIGITAL SIGNAL DETECTOR

[75] Inventor: John H. Painter, Newport News, Va.

[73] Assignee: The United States of America, Washington, D.C.

[22] Filed: Mar. 25, 1975

[21] Appl. No.: 561,764

[44] Published under the second Trial Voluntary Protest Program on January 27, 1976 as document No. B 561,764.

Related U.S. Application Data
[63] Continuation of Ser. No. 412,379, Nov. 2, 1973, abandoned.

[52] U.S. Cl. .............................. 178/88; 325/323; 325/349; 325/476; 235/150.1; 235/156
[51] Int. Cl.² .................... H04L 15/24; H04B 1/10; G06F 15/36
[58] Field of Search................. 235/181, 150.1, 156; 340/146.1 R; 178/66, 67, 88; 325/30, 320, 321, 323, 324, 349, 476

[56] References Cited
UNITED STATES PATENTS

| | | | |
|---|---|---|---|
| 3,378,847 | 4/1968 | Grover et al. | 325/476 |
| 3,396,369 | 8/1968 | Brothman et al. | 340/146.1 R |
| 3,490,040 | 1/1970 | Choquet et al. | 325/320 |
| 3,551,816 | 12/1970 | Paine | 325/321 |
| 3,614,626 | 10/1971 | Dillard | 325/323 |
| 3,736,507 | 5/1973 | Wolejsza, Jr. et al. | 178/67 |

OTHER PUBLICATIONS
Gooding: Performance Monitor Techniques for Digital Receivers Based on Extrapolation of Error Rate, IEEE Transactions on Communication Technology, Vol. COM-16, No. 3, June 1968, pp. 380-387.
Murray: FM Parallel Tone Transmission System, IBM Technical Disclosure Bulletin, Vol. 14, No. 12, May 1972, pp. 3631-3632
Belman et al.: FSK Digital Demodulator with Majority Decision Filtering, IBM Technical Disclosure Bulletin, Vol. 13, No. 4, Sept. 1970, pp. 1042-1043.
Chadwick et al.: The Design of a Low Data Rate MSFK Communication System, IEEE Transactions on Communication Technology, Vol. COM-18, No. 6, Dec. 1970, pp. 740-750.

Primary Examiner—Felix D. Gruber
Attorney, Agent, or Firm—William H. King; Howard J. Osborn; John R. Manning

[57] ABSTRACT

The invention is a detector for radio signals which have been transmitted through a multipath medium. The device operates in conjunction with the radio frequency portion of a receiver to detect digital signals which have been transmitted in known modulation formats. The transmitted signal is constructed by assigning known and distinct modulation waveforms to a sequence of message symbols, or digits. The basic digital message, which the detector is to reconstruct consists of a sequence of digits, each lasting for a fixed time, say T seconds, and each picked from an alphabet of arbitrary, but fixed, size. For example, in a binary message, the alphabet consists of the digits 0 and 1. In a quarternary message, the alphabet consists of the digits 0, 1, 2 and 3.

12 Claims, 14 Drawing Figures

ANTI-MULTIPATH DIGITAL SIGNAL DETECTOR

ORIGIN OF THE DISCLOSURE

The invention desribed herein was made by an employee of the United States Government and may be manufactured and used by or for the Government for governmental purposes without the payment of any royalties thereon or therefor.

This is a continuation, of application Ser. No. 412,379 filed Nov. 2, 1973, and now abandoned.

BACKGROUND OF THE INVENTION

The invention relates generally to radio communication and more specifically to a detector for radio signals which have been transmitted through a multipath medium.

In looking at the problem of communicating with aerospace vehicles in the 100 Mhz.–2000 Mhz. range, it becomes obvious that one of the fundamental challenges is that of reflection from the earth's surface, or "multipath". In approaching the problem, the system engineer's first inclination is, perhaps, to try to "evade" the multipath. For communication with a single vehicle, such as space shuttle, directivity in the ground antenna can be employed to eliminate illumination of the surface for all but very low elevation angles of the vehicle, provided a tracking antenna may be employed. For communication with limited numbers of vehicles, use may be made of short pulses with long waiting times between pulses to "beat the reflection" and "wait out the echoes." A variation of this scheme is "frequency-hopping" where the signal does not remain at any one frequency long enough for the reflection to arrive at that frequency. Unfortunately, waiting between pulses places a restriction on information rate and frequency-hopping presents an interference problem for the many vehicle cases.

It seems reasonable to assume that aerospace datalinks will employ digital signalling. From the standpoints of economy and maintainability of hardware, simple modulations, such as binary phase-shift-keying or binary frequency-shift-keying, seem indicated. Within the framework of simple modulation, and noting the restrictions caused by using modulation to evade the multipath reflection, it seems that one should deal with the detection process in attempting to combat multipath. By this is meant using modern detection and estimation methods in receiving given digital modulations in the presence of multipath interference. Multipath-adaptive detection seems especially attractive. It is therefore the primary purpose of this invention to provide a digital detector for radio signals that combats multipath interference.

The prior art for continuous detection of digital signals in multipath, using analog circuitry is not of direct concern to this disclosure. The prior art for sampled-data detection of digital signals in multipath is of direct closed herein is a practical, fully recursive, digital detector for digital signals in multipath.

SUMMARY OF THE INVENTION

This invention is a detector for radio signals which have been transmitted through a multipath medium. The device operates in conjunction with the radio frequency portion of a receiver, to detect digital signals which have been transmitted in known modulation formats. The transmitted signal is constructed by assigning known and distinct waveforms to a sequence of message sumbols, or digits. The basic digital message, which the detector is to reconstruct, consists of a sequence of digits, each lasting for a fixed time, say T seconds, and each picked from an alphabet of arbitrary, but fixed, size. For example, in a binary message, the alphabet consists of the digits 0 and 1.

To each digit in the alphabet corresponds a unique modulated carrier signal. For example, in a binary frequency-shift-keyed system, the digit 0 might correspond to a transmitted sine wave signal of 135.02 Mhz. frequency and the digit 1 might correspond to a transmitted sine wave signal of 135.01 Mhz. frequency. To transmit a sequence of digits, the corresponding modulated carrier signals are transmitted over succeeding time intervals of T seconds.

The transmitted signal is received after having suffered perturbations to its envelope and phase, due to passage through the multipath medium. The radio-frequency stages also add noise to the received signals. The detector operates so as to reconstruct the transmitted digital sequence with a minimum probability that any reconstructed digit will be in error.

The detector does not operate on the received signal continuously in time. Rather, operation is on samples of the received signal, taken at time intervals spaced uniformly within the basic digit interval of length T seconds. The number of data samples taken during detection of one message digit is a design variable, which is restricted only by the speed of the detector digital logic. Each data sample is encoded into a digital format suitable to the detector logic, by an analog to digital (A/D) converter. The detector operates on the samples recursively, requiring storage of no more than one data sample at any given time.

Internally, the detector produces estimates of the perturbations of the received signal which were caused by the multipath. The estimates are used to improve the detection of the transmitted digital symbol. Thus, the detector is a multipath cancelling device.

BRIEF DESCRIPTION OF THE DRAWINGS

FIG. 9 is a block diagram of circuit for multiplying a matrix by a vector;

FIG. 11 is a block diagram of a circuit obtaining the inverse of a matrix.

DETAILED DESCRIPTION OF THE INVENTION

Figure 1:
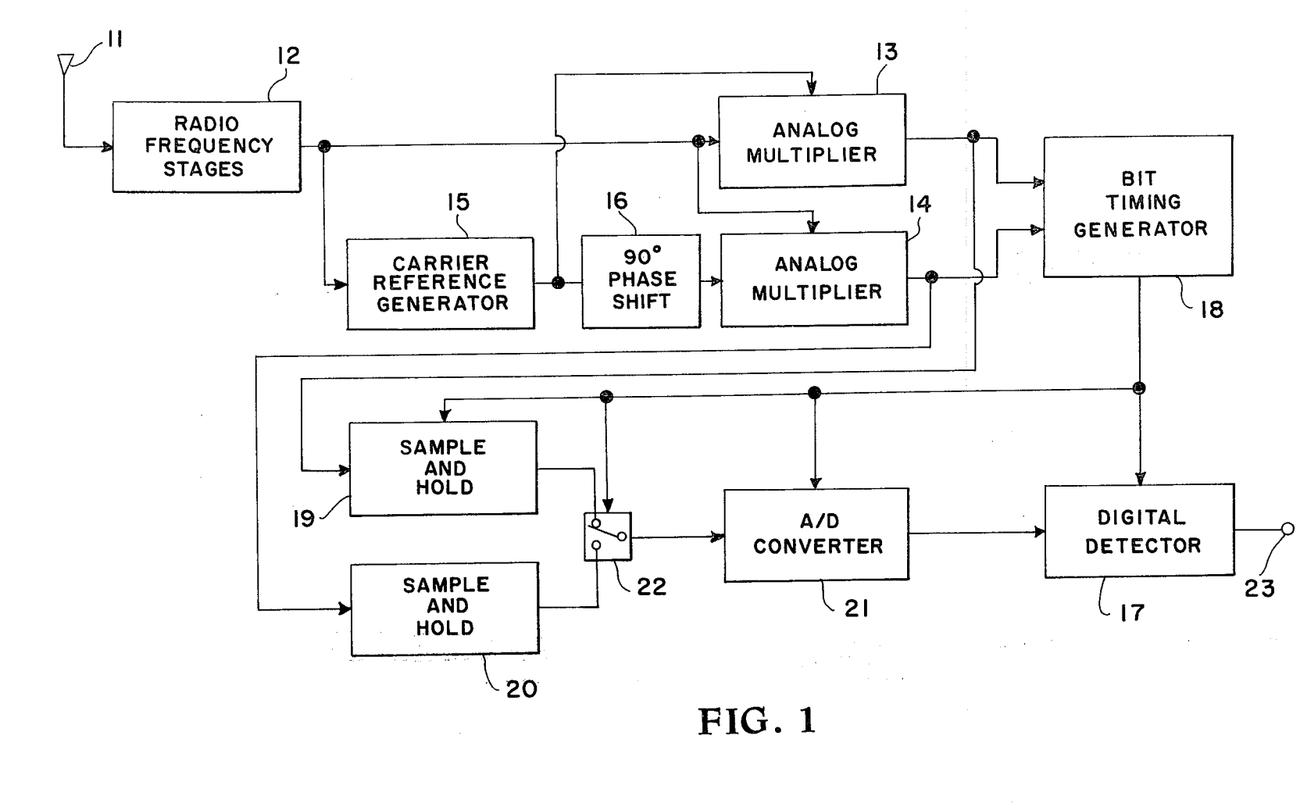
FIG. 1 is a block diagram of the receiver incorporating the invention.

Turning now to the embodiment of the invention selected for illustration in the drawings, FIG. 1 is an overall receiver block diagram that includes the invention. The invention is a receiver for binary phase-shift-keyed (PSK) radio signals which have been transmitted through a multipath propagation medium. The receiver consists of standard analog superheterodyne radio frequency and detection stages and unique digital detection stages.

The transmitted signal is formed from the multiplication of a two-level modulation square-wave-form times a phase-stable sinusoidal waveform of frequency $f$ Hz. The modulating squarewaveform, which conveys the digital message information, takes on only the values, +1 and −1 (volts). The carrier sine wave has arbitrary amplitude, dependent on the transmitted power level.

The modulating square-waveform is of the non-return-to-zero (NRZ) type, and changes sign only at discrete times separated by integer multiples of a basic "bit timing period", which is 1/2400 second in duration. The square wave is obtained from a binary message sequence made up from the digits, "0" and "1". The digital sequence of 0's and 1's is transformed into the modulating square waveform by assigning the amplitude +1 to a digit 0 and the amplitude −1 to a digit 1.

The transmitted signal is received by an antenna 11 and applied to conventional radio frequency (RF) stages 12. The output of RF stages 12, in addition to noise added to it by the RF stages, has suffered perturbations to the carrier envelope and phase, due to passage of the RF signals through a multipath medium. The output of RF stages 12 is applied to an analog multiplier 13, an analog multiplier 14 and a carrier frequency generator 15. Carrier frequency generator 15 generates a sine wave which is phasecoherent to the carrier wave of the received signal. This generation is straight-forward and is accomplished by first squaring the intermediate frequency (i.f.) signal and then phase-locking an oscillator to the resultant signal (*IEEE Transactions on Communications Technology*, Vol. COM-16, pp 541–550, Aug. 1968). The output of generator 15 is applied to multiplier 13, and shifted in phase 90° by a phase shifter 16 and then applied to multiplier 14 to demodulate the i.f. signal. The resultant two signal components, at the outputs of multipliers 13 and 14 form "quadrature components" which are eventually processed by a digital detector 17.

The quadrature components each contain noisy replicas of the square waveform modulation signal. A basic timing signal is recovered from the quadrature components by a bit timing generator 18 using a bit synchronizing circuit which detects the times of transition between adjacent symbols (*IEEE Transactions on Communications Technology*, Vol. COM-18, pp 48–59, Feb. 1970 and pp 141–147, April 1970). This timing signal has a frequency of 24,000 Hz. which is ten times the frequency of the message digits. Hence, the number of data samples taken during the detection of one message digit is ten. This is a design variable which obviously can be different.

The quadrature components are simultaneously sampled at the approximate rate, as determined by the timing signal, and the samples are held using zero-order-hold sample and hold circuits 19 and 20. The outputs of the circuits 19 and 20 are read into an analog-to-digital (A/D) converter 21 using a synchronous commutator 22. An eleven-bit word corresponding to the in-phase sample and an eleven-bit-word corresponding to the quadrature sample are alternately gated into the digital detector 17 by commutator means in A/D converter 21. The timing of the circuitry is so designed that the in-phase word is gated in earlier than the quadrature word. The in-phase word is then stored in a register sufficiently long so that both words may be processed by digital detector 17 simultaneously. The digital detector produces, at output terminal 23, the digital message sequences of 0's and 1's which have been detected. It is obvious that if two A/D converters are used each quadrature component can be applied directly to its corresponding A/D converter thereby eliminating the other circuitry.

Figure 2:
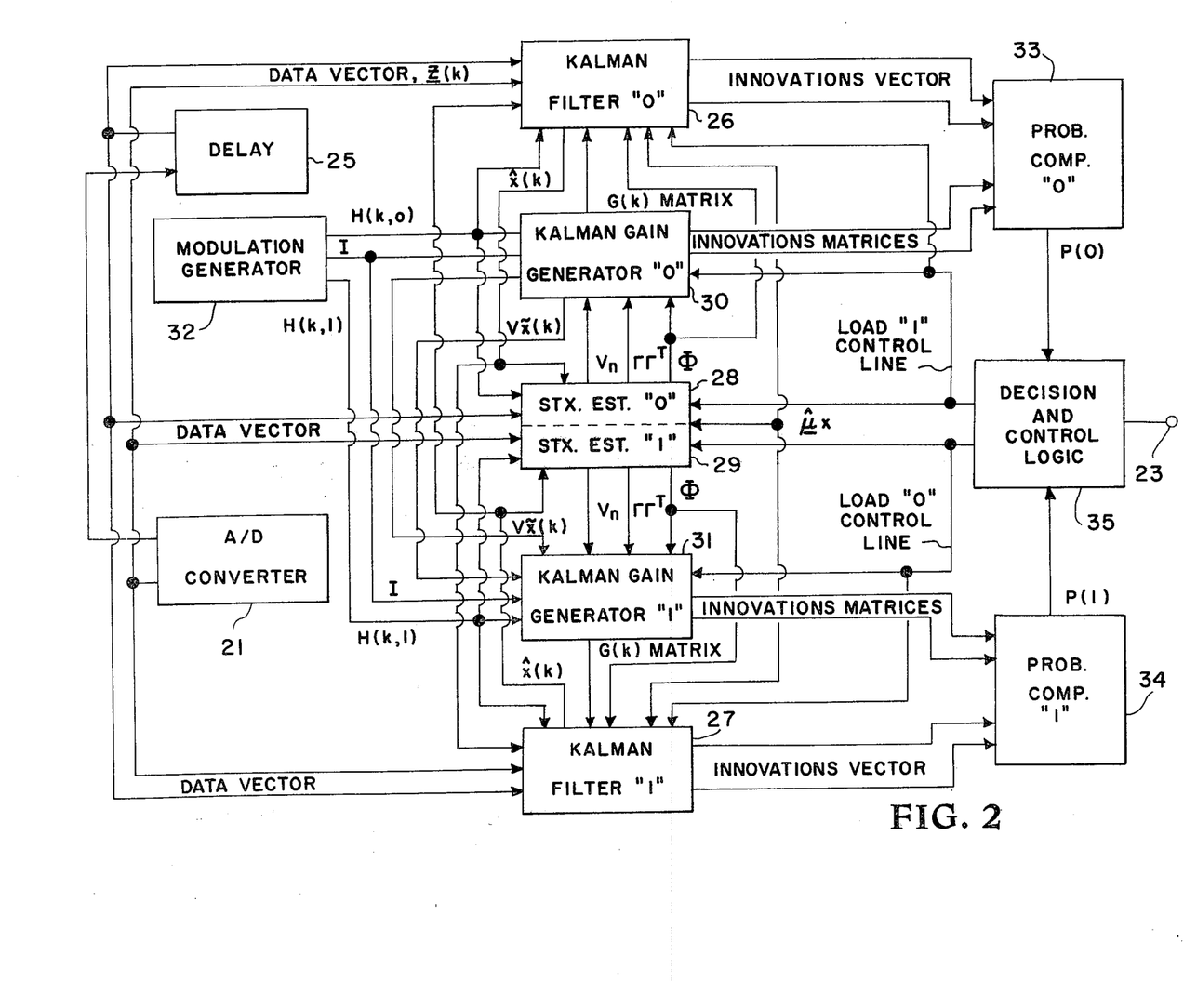
FIG. 2 is a block diagram of the digital detector used in the receiver.

FIG. 2 shows a block diagram of the digital detector 17, commencing with the A/D converter 21. The converter reads out the two 11-bit words associated with any individual sample for the "in-phase" and "quadrature" channels. After adjusting the in-phase word timing by means of a delay 25, these two words form the "input data vector", which is routed on to the various digital devices.

The data vectors are processed in parallel by two Kalman filters 26 and 27 and two statistics estimators 28 and 29. The Kalman filters also require inputs from two Kalman gain generators 30 and 31 from statistics estimators 28 and 29, and from a modulation generator 32. The Kalman filters and gain generators, in turn, feed information to two probability computers 33 and 34. The probability computers feed a decision and control logic device 35.

The purpose of the Kalman filter, gain generator and probability computers, bearing the label 0 is to process the 10 data sample vectors and then compute the resulting probability that the message digit received was a 0. The devices marked 1 process the same input data and compute the probability that the message digit received was a 1. The decision and control logic compares the two computed probability numbers and decided which number is greatest. The device produces, at output terminal 23, a digit 0 if the computed probability of 0 is greatest, or a digit 1 if the computed probability of 1 is greatest.

Identical pairs of filters, generators, statistics estimators, and probability generators are used in one-to-one correspondence with the digits 0 and 1. The operation of opposite members of each pair of devices differs only in that the 0 members are furnished one array of "modulation numbers" (or modulation matrix), $H(k,0)$, while the 1 members are furnished $H(k,1)$. The operations of the probability computers differs only in that the 0 device processes information from the 0 filter and generator, while the 1 device processes information from the 1 filter and generator.

For each sample data vector processed, the filter produces an "innovations vector", which is fed to the probability computer. The Kalman gain generator does not process the data vector. It processes only the modulation matrix and various statistical matrices produced by the statistics estimator. The gain generator produces a gain matrix, which is routed to the Kalman filter, and an innovations variance matrix and its inverse, which are routed to the probability computer. The statistics estimator processes the data vector to produce the statistical matrices and a "mean" vector. The mean vector is used by the Kalman filter. The statistics estimator also uses a vector produced by the filter.

A description is now given, in terms of the computational algorithms, of the operations performed during each message period by single members of the pairs of devices.

Let $k$ denote the number of a particular data sample. During the first message digit period, $k$ varies from 1 to 10. The kth input data vector, consisting of two 11-bit words, is denoted $z(k)$. The $z(k)$ is viewed mathematically as a matrix having one column and two rows. Thus, $$z(k) = \begin{bmatrix} z_i(k) \\ z_q(k) \end{bmatrix} \quad (1)$$

where $z_i(k)$ is the number in the "in-phase" data sample and $Z_q(k)$ is the number in the "quadrature" data sample at the kth sampling time, as represented by the appropriate 11-bit digital word. The detection algorithms are derived under the assumption that the data sample is generated from the mathematical model, $$z(k) = H(k,m) x(k) + n(k) \quad (2)$$

In equation (2), $n(k)$ is an array of two numbers (column 2-vector), representing the noise added into the two channels by the radio frequency circuitry. $x(k)$ is an array of 2 numbers (column 2-vector), representing the multipath perturbations (including the direct path). $H(k,m)$ is an array of 4 numbers (2 × 2 matrix) which represents the signal modulation. The index, $m$, represents the number of the message digit being transmitted and is either 0 or 1.

Each Kalman filter produces an estimate of $x(k)$, using the different modulation matrices, $H(k,0)$ and $H(k,1)$. Thus, the 0 filter estimates $x(k)$ under the assumption that 0 was received and the 1 filter estimates $x(k)$ under the assumption that 1 was received. The estimate of the "0" filter is denoted $\hat{x}(k/0)$. The estimate of the 1 filter is denoted $\hat{x}(k/1)$. The algorithms governing the operation of the filter are $$\begin{aligned}\hat{x}(k/m) &= \hat{x}(k/k-1,m) + G(k)[z(k) - \hat{z}(k/k-1,m)] \\ \hat{z}(k/k-1,m) &= H(k,m)\hat{x}(k/k-1,m) \\ \hat{x}(k/k-1,m) &= \Phi \hat{x}(k-1/m) + (I - \Phi) \hat{\mu}_x\end{aligned} \quad (3)$$

In equations (3), $\hat{x}(k/k-1,m)$ is the estimate of $x(k)$ made by the "mth" filter after it has processed only the $(k-1)$st sample. Thus, $\hat{x}(k/k-1,m)$ is a "one-stage prediction". $G(k)$ is the gain matrix, which is provided by the Kalman gain generator. $\hat{z}(k/k-1,m)$ is a one-stage prediction of the data vector, itself, $\Phi$ is a statistics matrix which is provided from the statistics estimator. $\hat{\mu}_x$ is the estimated means of the $x(k)$ vector, as provided by the statistics estimator. The innovations vector which the mth filter is to provide to the mth probability computer is precisely the vector $z(k) - \hat{z}(k/k-1,m)$. This is the error which the filter predicts it will make at each sample, in terms of the incoming data vector.

The algorithms governing the operation of the Kalman gain generator are $$\begin{aligned}G(k) &= V_{\tilde{x}}(k/k-1,m)H^T(k,m)V_z^{-1}(k/k-1,m) \\ V_z(k/k-1,m) &= H(k,m) V_{\tilde{x}}(k/k-1,m)H^T(k,m) + V_n \\ V_{\tilde{x}}(k/k-1,m) &= \Phi V_{\tilde{x}}(k-1/m) \Phi^T + \Gamma \Gamma^T \\ V_{\tilde{x}}(k,m) &= [I - G(k)H(k,m)] V_{\tilde{x}}(k/k-1,m)\end{aligned} \quad (4)$$

In equations (4), the notation, $(\,)^T$, denotes transpose of a matrix, $V_z(\,)$ and $V_z^{-1}(\,)$ are the variance matrix and inverse, respectively, of the innovations vector, which are to be provided to the probability computer. The matrix, $V_n$, is the variance matrix of the additive noise vector, $n(k)$, which must be provided by the statistics estimator. Likewise, $\Gamma$ is the statistics matrix, provided by the statistics estimator.

The probability computers compute numbers, $P(0)$, and $P(1)$, which are proportional to the true probabilities that 0 and 1 were received, respectivley. The governing algorithms are $$P(m) = p(m) \; \pi^{10}_{k=1} \, p(k/m)$$

$$p(k/m) = \frac{1}{2\pi \sqrt{V_z(k/k-1,m)}} \exp\left\{ -\frac{1}{2}[z(k)-\hat{z}(k/k-1,m)]^T \; V_z^{-1}(k/k-1,m) \; [z(k)-\hat{z}(k/k-1,m)]\right\} \quad (5)$$

In equations (5), $p(m)$ is the expected relative occurrence of the digits, $= 0, 1$, which in this disclosure is taken as ½. The symbol $\pi$ denotes a 10-fold product of the $p(k/m)$ for $k = 1, 2, \ldots 10$.

Before detailing the operation of the statistics estimators, the operation of the filter-generator-computer combination is explained. To start the algorithms for the first message digit period, initializing values are set into the filters and gain generators for the vector, $x(1/0,m)$ and for the matrix, $V_x(1/0,m)$. These quantities are taken as $$x(1/0,m) = \begin{bmatrix} K \\ 0 \end{bmatrix}; \; V_x(1/0,m) = \begin{bmatrix} 1 & 0 \\ 0 & 1 \end{bmatrix}; m=0,1 \quad (6)$$

where $K$ is a constant which must be determined empirically, given the automatic gain control properties of the radio frequency receiver, and the various gain constants in the data channel. Once initialized, the devices operate over the first 10 samples, as per the algorithms of equations (3) through (5). After the processing of the 10th sample, the computed probability numbers, $P(0)$ and $P(1)$, are compared and the decision made as to which was received, 0 or 1. After the decision has been made, the values of $\hat{x}(10/9,m)$ and $V_{\tilde{x}}(10/9,m)$, are taken from the correct value of $m$ and these values are used to reinitialize all the filters and gain generators for the next message digit period, according to the algorithms, $$\begin{aligned}\hat{x}(11/10,m) &= \Phi \hat{x}(10/9,m) + (I - \Phi)\hat{\mu}_x \\ V_{\tilde{x}}(11/10,m) &= \Phi V_x(10/9,m) \, \Phi^T + \Gamma \Gamma^T\end{aligned} \quad (7)$$

It is for this purpose of reinitialization that the "load control lines" are connected from the decision and control logic to the various devices in FIG. 2.

The embodiment disclosed herein is for operation at a carrier frequency of 1.550 Ghz on an aircraft to satellite link over an ocean surface. For this embodiment, the $\Phi$ and $\Gamma\Gamma^T$ matrices may be fixed at the following values $$\Phi = \exp(-04) \begin{bmatrix} 1 & 0 \\ 0 & 1 \end{bmatrix} \quad (8)$$

$$rr^T = (1-\exp(-08)) \begin{bmatrix} 1 & 0 \\ 0 & 1 \end{bmatrix}$$

The mean vector $\hat{\mu}_x$, and noise variance matrix, $\hat{V}_n$ are estimated according to the following algorithms, $$\hat{\mu}_x(10J) = \frac{N_{\hat{\mu}}(10\,J)}{d_{\hat{\mu}}(J)}; J = 1,2,...$$

$$\begin{aligned}
d_{\hat{\mu}}(J) &= 1 + \alpha\, d_{\hat{\mu}}(J-1); d_{\hat{\mu}}(0) = 1 \\
N_{\hat{\mu}}(10J) &= P(10J) + \alpha\, N_{\hat{\mu}}(10(J-1)); \\
N_{\hat{\mu}}(0) &= P(0) \text{ given}
\end{aligned} \quad (9)$$

$$P(10\,J) = \frac{1}{10} \sum_{k=10(J-1)+1}^{10J} H^{-1}(k,m)z(k) ; \alpha < 1$$

$$Vn(10\,J) = \frac{N_v(10\,J)}{d_v(J)}, J = 1,2,...$$

$$N_v(10J) = P_v(10J) + \alpha_v N_v(10(J-1)); N_v(0) = P_v(0)$$
given
$$d_v(J) = 1 + \alpha_v d_v(J-1); d_v(0) = 1, \alpha_v < 1$$

$$P_v(10J) = \frac{1}{10} \sum_{k=10(J-1)+1}^{10J} [z(k)-H(k,m)x(k)][z(k)-H(k,m)x(k)]^T$$

The algorithms (9) and (10) both represent "vanishing memory, sample-mean" estimates of the mean, $\hat{\mu}_x$, and variance, $\hat{v}_n$. It is seen from (9) that the mean estimator processes the data vector, $z(k)$, and modulation matrix, $H(k,m)$. The mean estimator in the statistics estimator labeled 0 uses $H(k,O)$, etc. After the 10th sample had been processed and the bit decision made, then the correct $P(10J)$ is entered into the algorithms for $N_{\hat{\mu}}(10J)$. The index, $J$, denotes the number of the message bit being processed. That is, after the first 10 samples, $J = 1$. After the second set of 10 samples, $J = 2$, etc. The argument, $10J$, thus denotes that the various estimates are only available for use after every set of 10 samples has been processed.

It is seen from (10) that the estimator for the noise variance, $\hat{V}_n$ processes the data vector, $z(k)$, the modulation matrix, $H(k,m)$, and the filtered estimate, $\hat{x}(k)$. Thus, the 0 statistics estimator and the 1 statistics estimator both form the sums for $P_v(10J)$ during the 10-sample processing periods, with the correct sum being entered into the algorithm for $N_v(10J)$ after the bit decision has been made.

For this embodiment, the values used for $\alpha_v$ and $\alpha$ are
$$\alpha_v = 0.998 = \alpha_{\hat{\mu}} \quad (11)$$
Also, for this embodiment, the modulation matrices are $$H(k,0) = \begin{bmatrix} 1 & 0 \\ 0 & 1 \end{bmatrix} ; H(k,1) = \begin{bmatrix} -1 & 0 \\ 0 & -1 \end{bmatrix} \quad (12)$$

The identity matrix, $I$, which is also generated in the modulation matrix generator, is given by $$I = \begin{bmatrix} 1 & 0 \\ 0 & 1 \end{bmatrix} \quad (13)$$

Figure 3:
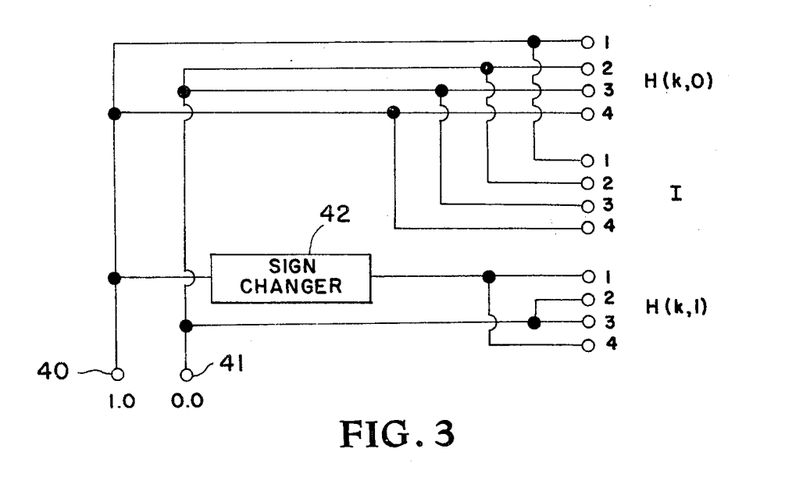
FIG. 3 is a block diagram of the modulation generator used in the digital detector.

The modulation generator 32 is shown in more detail in FIG. 3. An 11-bit binary word that represents the number 1.0 is applied to terminal 40 and an 11-bit binary word that represents the number 0.0 is applied to terminal 41. A sign changer 42 changes the 11-bit word that represents 1.0 to an 11-bit word that represents −1.0. Alternatively, an 11-bit word that represents −1.0 can be generated independently. The matrices $H(k,o)$, $H(k,l)$ and 1 as shown in equations 12 and 13 appear at the terminals indicated in FIG. 3. The numbers 1–4 on the terminals indicate the positions in the matrix that that terminal represents: terminas 1 and 2 form the first row of the matrix and the terminals 3 and 4 form the second row of the matrix.

Figure 4:
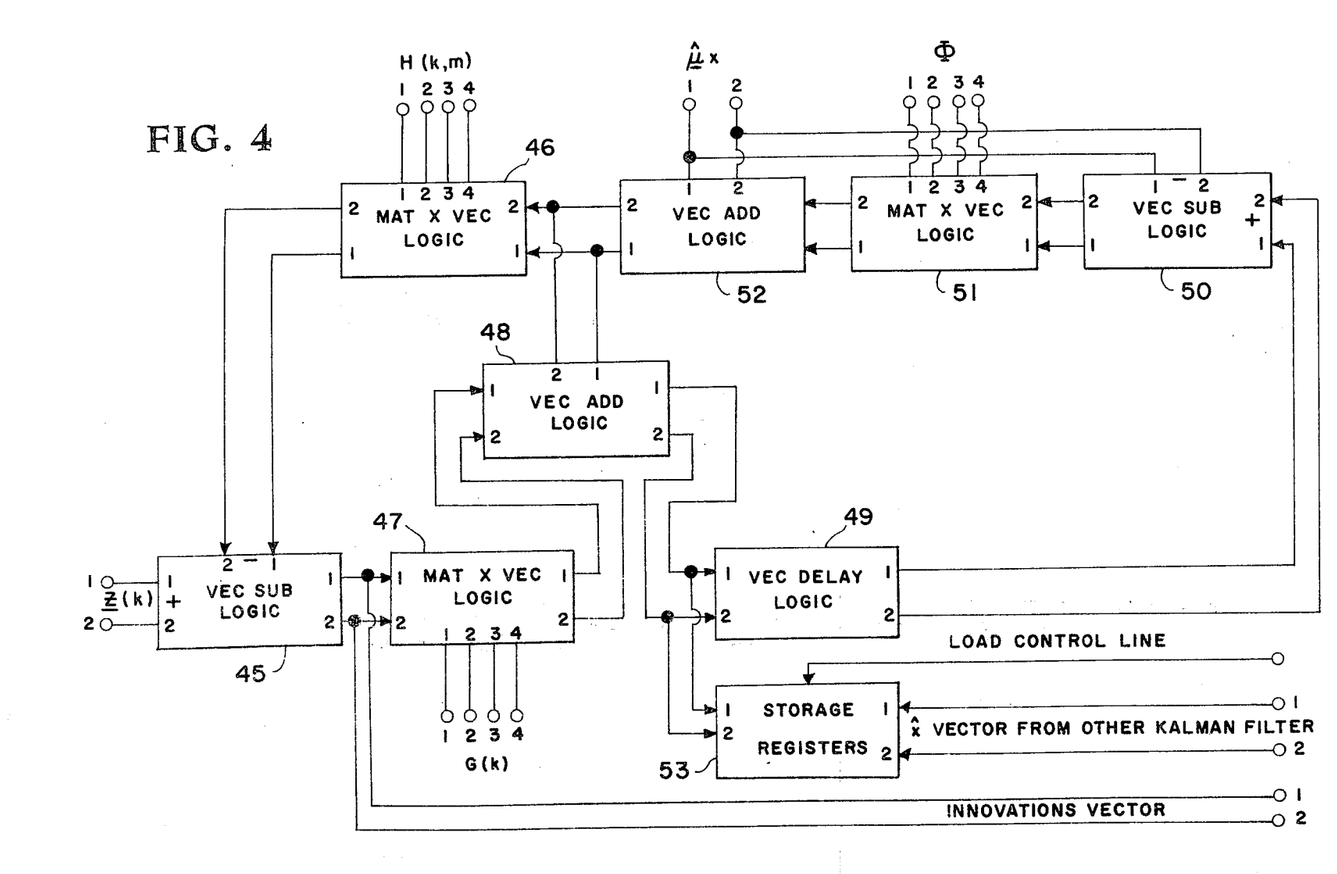

A Kalman filter suitable for use as Kalman filters 26 and 27 in FIG. 2 is shown in more detail in FIG. 4. The operation of this Kalman filter is governed by the algorithms (3) disclosed earlier in this specification. Input data vector $z(k)$ from the A/D converter 21 is applied to the positive input of a VEC SUB logic circuit 45. The negative input to VEC SUB logic circuit 45 is supplied by a MAT X VEC logic circuit 46. VEC SUB logic circuit 45 and all other VEC SUB logic circuits consists of two subtractors connected in parallel. One of the subtractors subtracts the 1 inputs and the other subtractor subtracts the 2 inputs. The output from VEC SUB logic 45, which is the innovations vector, is applied to a MAT X VEC logic circuit 47 disclosed in detail in FIG. 9, and to the probability computer corresponding to the particular Kalman filter. The MAT X VEC logic circuit 47 multiplies the innovations vector from the VEC SUB logic circuit 45 by a G(k) matrix from the corresponding Kalman gain generator to form the last term of the first algorithm (3). This term is added to the output from VEC ADD logic 52 by means of a VEC ADD logic circuit 48 to complete the first algorithm (3). VEC ADD logic 48, and all other VEC ADD logic circuits, is two adders connected in parallel to add the 1 inputs and the 2 inputs, respectively. The output of VEC ADD logic 48 is applied to a VEC Delay logic circuit 49, which is two shift registers connected in parallel, and then applied to the positive input of a VEC SUB logic circuit 50. The mean vector $\hat{\mu}_x$ from the corresponding statistics estimator is applied to the negative inputs of VEC SUB logic circuit 50. The vector output of VEC SUB logic 50 is multiplied by a matrix $\Phi$ from the corresponding statistics estimator by means of a MAT X VEC logic circuit 51 and then applied to VEC ADD circuit logic 52 where it is added to the $\mu_x$ vector to form the last of the algorithms (3). This vector in addition to being applied to the VEC ADD logic circuit 48 is multiplied by the $H(k,m)$ matrix from the modulation generator 32 by means of MAT X VEC logic circuit 46 to form the second of the algorithms (3).

The output of VEC ADD logic circuit 48, in addition, to being applied to the VEC DELAY logic circuit 49, is applied to storage registers 53. Storage registers 53 consist of 4 storage registers: two for one Kalman filter and two for the other Kalman filter. Also connected to the storage register 53 is one of the load control lines from the decision and control logic circuit 35 in FIG. 2. Whenever decision and control logic circuit 35 produces a signal at output terminal 23, its load control line produces a signal that dumps the two storage registers 53 corresponding to the signal produced at terminal 23 into the non-corresponding VEC DELAY logic circuit 49.

Figure 5:
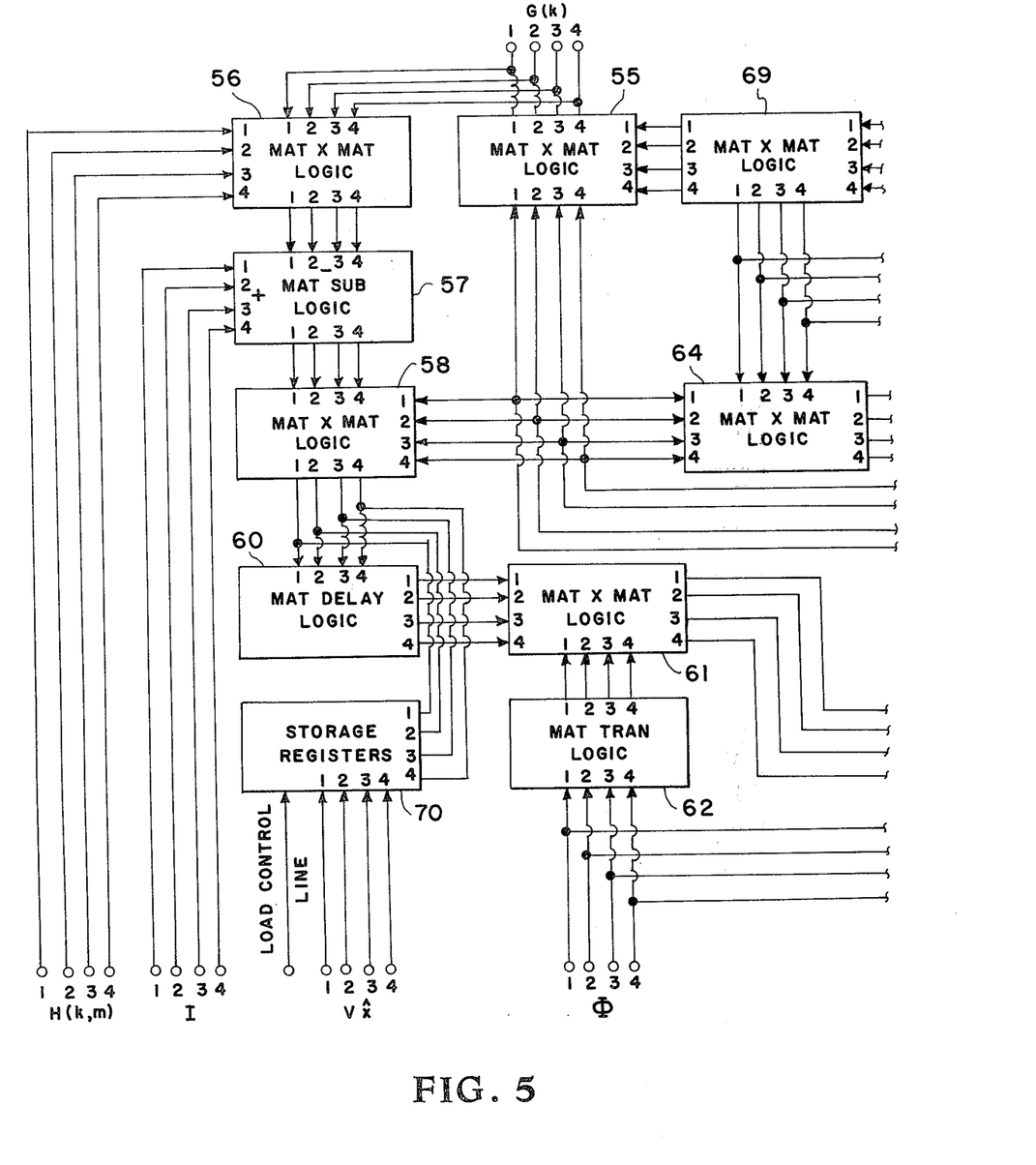
Figure 5A:
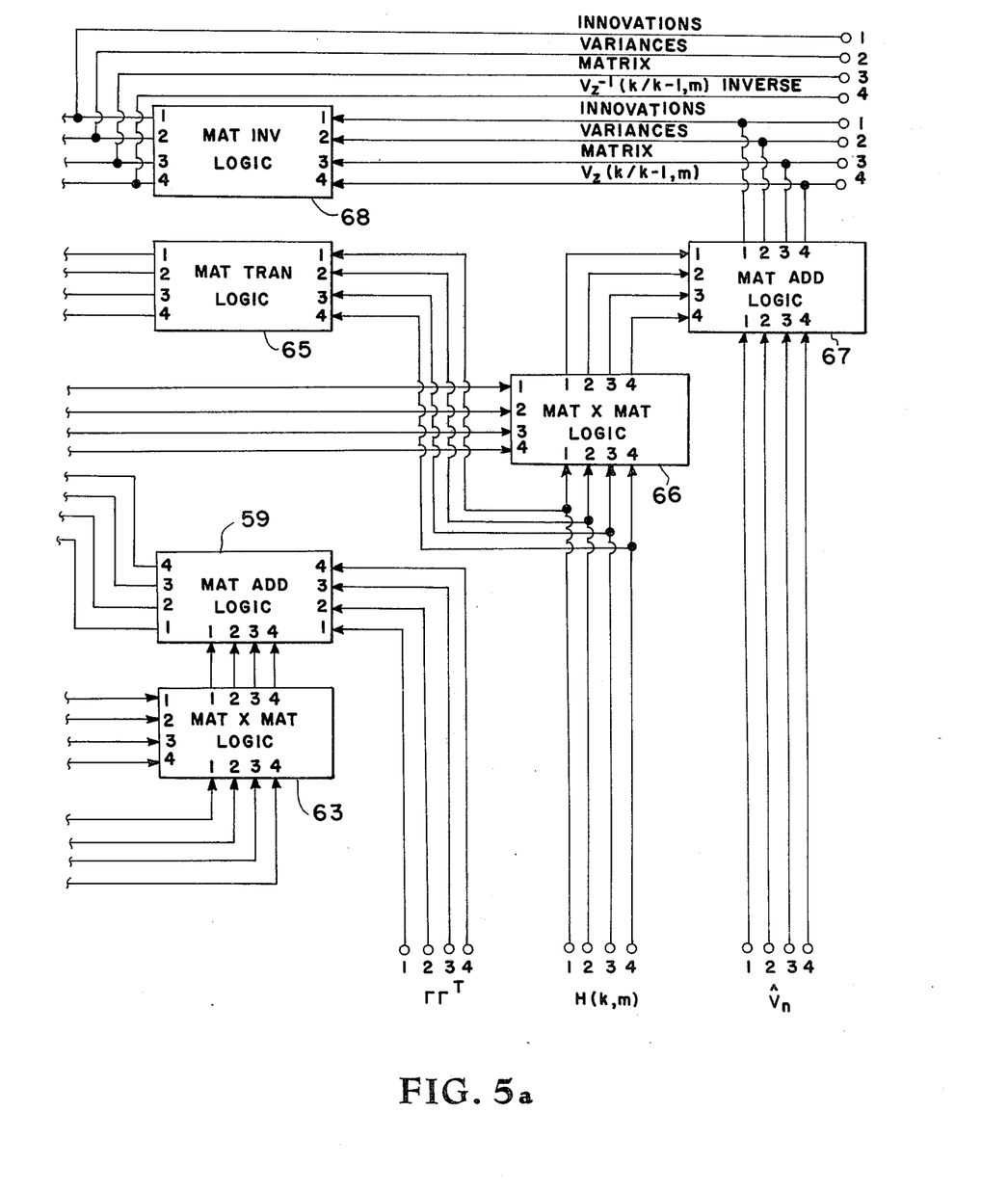

A Kalman gain generator suitable for use as the Kalman gain generators 30 and 31 in FIG. 2 is shown in detail in FIGS. 5 and 5a. Algorithms 4 govern the operation of this Kalman gain generator. The $G(k)$ matrix at the output of MAT X MAT logic circuit 55 and the $H(k,m)$ matrix from the modulation generator 32 are applied to a MAT X MAT logic circuit 56 which multiplies these two matrices. Circuitry suitable for this and all other MAT X MAT logic circuits is disclosed in detail in FIG. 10. The resulting matrix is subtracted from the identity matrix I, provided by modulation generator 32 by means of a mAT SUB logic circuit 57. The resulting matrix is multiplied by the matrix at the output of a MAT ADD logic circuit 59 by means of a MAT X MAT logic circuit 58 to form the matrix identified by the last of the algorithms 4. This matrix is delayed by MAT DELAY logic circuit 60 and applied to a MAT X MAT logic circuit 61. The matrix $\Phi$ from the statistic estimator is applied to a MAT TRAN logic circuit 62 to form the transpose of the $\Phi$ matrix which is applied to the MAT X MAT logic circuit 61. Logic circuit 62 and all other MAT TRAN logic circuits consist of connecting the 1 input to the 1 output, the "2" input to the 3 output, the 3 input to the 2 output and the 4 input to the 4 output. The output of the MAT X MAT logic circuit 61 is multiplied by the $\Phi$ matrix by means of a MAT X MAT logic circuit 63. The resulting matrix is added to the $\Gamma\Gamma^T$ matrix from the statistics estimator by means of a MAT ADD logic circuit 59 to form the matrix defined by the next to last algorithm 4, which was applied to the MAT X MAT logic circuit 58. The transpose of the $H(k,m)$ matrix from the modulation generator is formed by a MAT TRAN logic circuit 65. This transpose matrix is multiplied by the matrix from the output of MAT ADD logic circuit 59 by means of a MAT X MAT logic circuit 64 to form a matrix which is multiplied by the $H(k,m)$ matrix by means of a MAT X MAT logic circuit 66. The resulting matrix is added to the $\hat{V}_n$ matrix from the statistics estimator by means of MAT ADD logic circuit 67 to complete the second of the algorithms 4. This matrix is the innovations variance matrix which is applied to the probability computer and inverted by a MAT INV logic circuit 68 to form the innovation variance matrix inverse which is also applied to the probability computer. Circuitry suitable for logic circuit 68 and all other MAT INV logic circuits is disclosed in FIG. 11. The innovation variance matrix inverse is applied to a MAT X MAT logic circuit 69 where it is multiplied by the transpose of the $H(k,m)$ matrix from the MAT TRAN logic circuit 65. The resulting matrix is multiplied by the output from the MAT ADD logic circuit 59 by means of the MAT X MAT logic circuit 55 to form the $G(k)$ matrix defined by the first of the algorithms 4. This matrix is applied to the corresponding Kalman filter. Storage registers 70 consist of 8 separate storage registers for registering the outputs of the MAT X MAT logic circuit 58 from both of the Kalman gain generators. In response to the signal on the load control line, the 4 storage registers corresponding to the selected output of the decision and control logic 35 will be dumped into the MAT DELAY logic circuit 60 of the noncorresponding Kalman gain generator.

Figure 6:
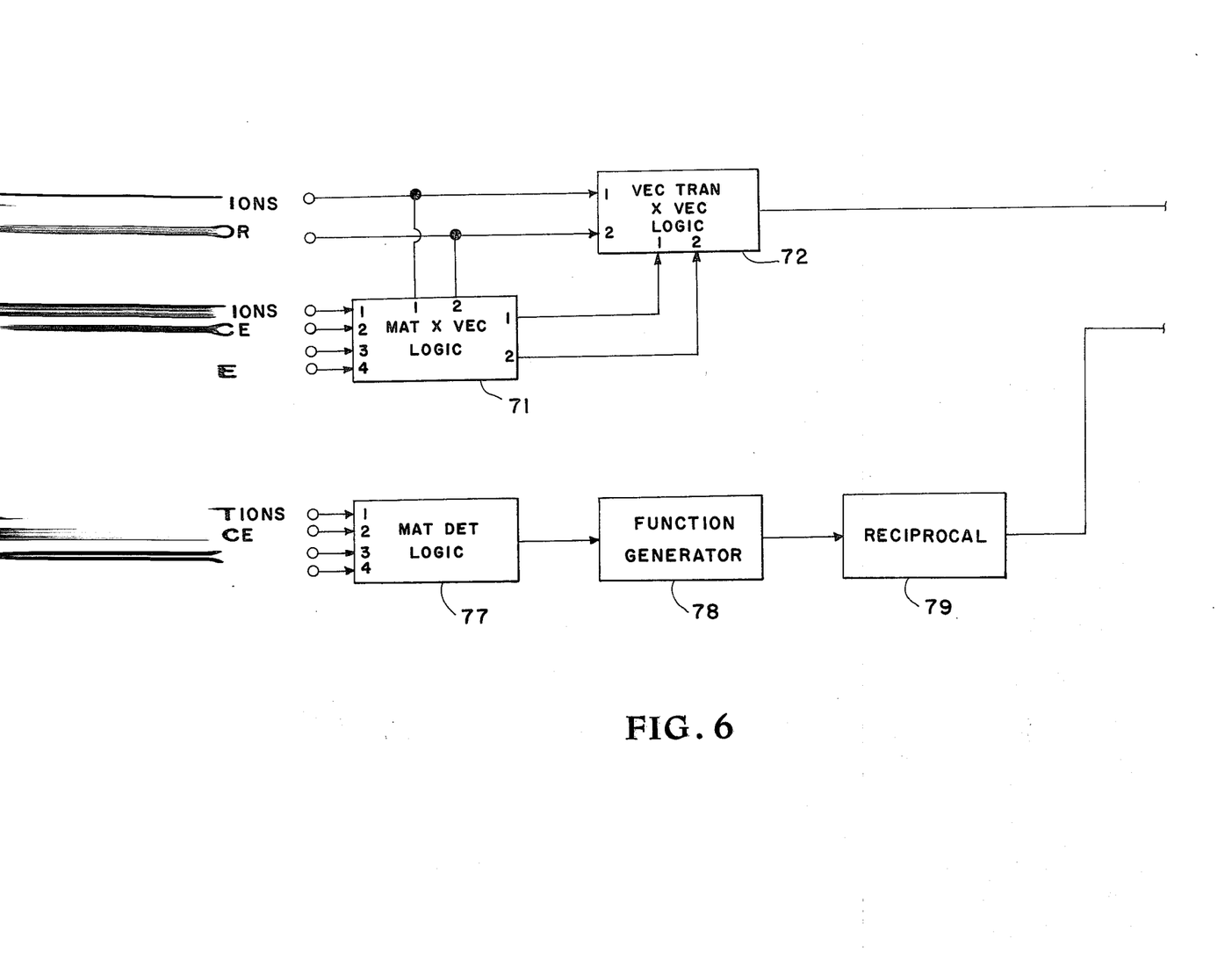

FIGS. 6 and 6a disclose a probability computer suitable for use as the probability computers 33 and 34 in FIG. 2. The determinant of the innovation variance matrix from the Kalman gain generator is computed by means of a MAT DET logic circuit 77. This logic circuit consists of two multipliers and a subtractor. The 1 and 4 inputs are applied to the first multiplier and the 2 and 3 inputs are applied to other multipliers. The output of the first multiplier is applied to the positive input of the subtractor and the output of the other multiplier is applied to the negative input of the subtractor. The output of the subtractor is the determinant of the matrix. This determinant is applied to a function generator 78 which takes the square root of the determinant and multiplies it by $2\pi$. The reciprocal of the output of function generator 78 is taken by reciprocal device 79 and applied to a multiplier 76. Reciprocal device 79 can be a divider for dividing the output of the function generator 78 into the number 1. The innovations vector from the Kalman filter is multiplied by the innovations matrix inverse from the Kalman filter gain generator by means of a MAT X VEC logic circuit 71. The innovations vector is transposed and multiplied by the output of MAT X VEC logic circuit 71 by means of VEC TRAN X VEC logic circuit 72. Logic circuit 71 consists of two multipliers and an adder. The two 1 inputs are applied to one multiplier and the two 2 inputs are applied to the other multiplier. The outputs of the two multipliers are connected to the adder with the output of the adder being the output of the logic circuit. The output of the logic circuit 72 has its sign changed by means of sign changer 73 and then divided by two by means of a divider 74. The output of divider 74 is applied to a function generator 75 which takes the exponential of the function and then applies to a multiplier 76. The output of multiplier 76 is represented by the second of the algorithms 5. The output of multiplier 76 is applied to a multiplier 80 which has its other input connected to the output of a shift register 81. The output of multiplier 80 is connected to shift register 81 and to a gate 84. A gate 82 with an initial condition 1 connected to it is applied to the input of shift register 81. A control logic circuit 83 which is controlled by the timing signal controls both gates 82 and 84. The output of gate 84 is divided by two by a divider 85 to produce the first of the algorithms 5. The output representing this algorithm is produced in the following manner. When a timing signal is received by control logic 83, gate 82 is opened and the initial condition in 1 is dumped into the shift register 81. This 1 is multiplied by the output from the output multiplier 76 which is then stored in the shift register 81. Thereafter the output from the shift register 81 is multiplied by the output from multiplier 76 to produce another output which is again stored in the shift register 81. This process continues for 10 samples at which time the control logic 83 opens gate 84 gating the output of multiplier 80 to the divider 85 thereby producing the signal representing the first of the algorithms 5.

Figure 7:
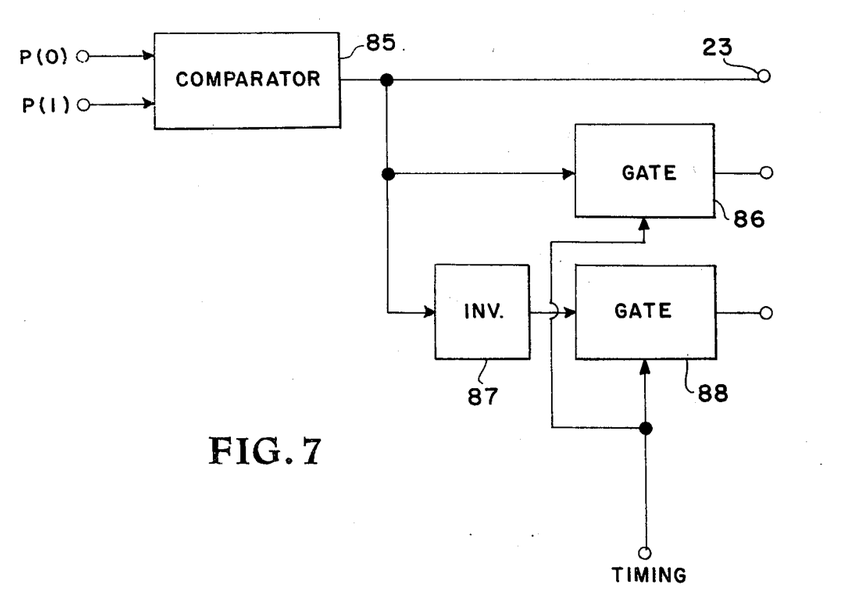

The decision and control logic circuit 35 in FIG. 2 is shown in more detail in FIG. 7. The outputs from the two probability computers 33 and 34 are compared by a comparator 85 to produce a signal representing the symbol (0 or 1) that had the larger probability of being transmitted. This signal appears on output terminal 23 and is also applied to a gate 86 and inverted by an inverter 87 and applied to a gate 88. Each time a time signal is applied to the gates 86 and 88 the output signal appears at the output of gate 86 and the inverse of this output signal appears at the output of gate 88. The output of gate 86 is the load 1 command and the output of gate 88 is the load "0" command.

Figure 8:
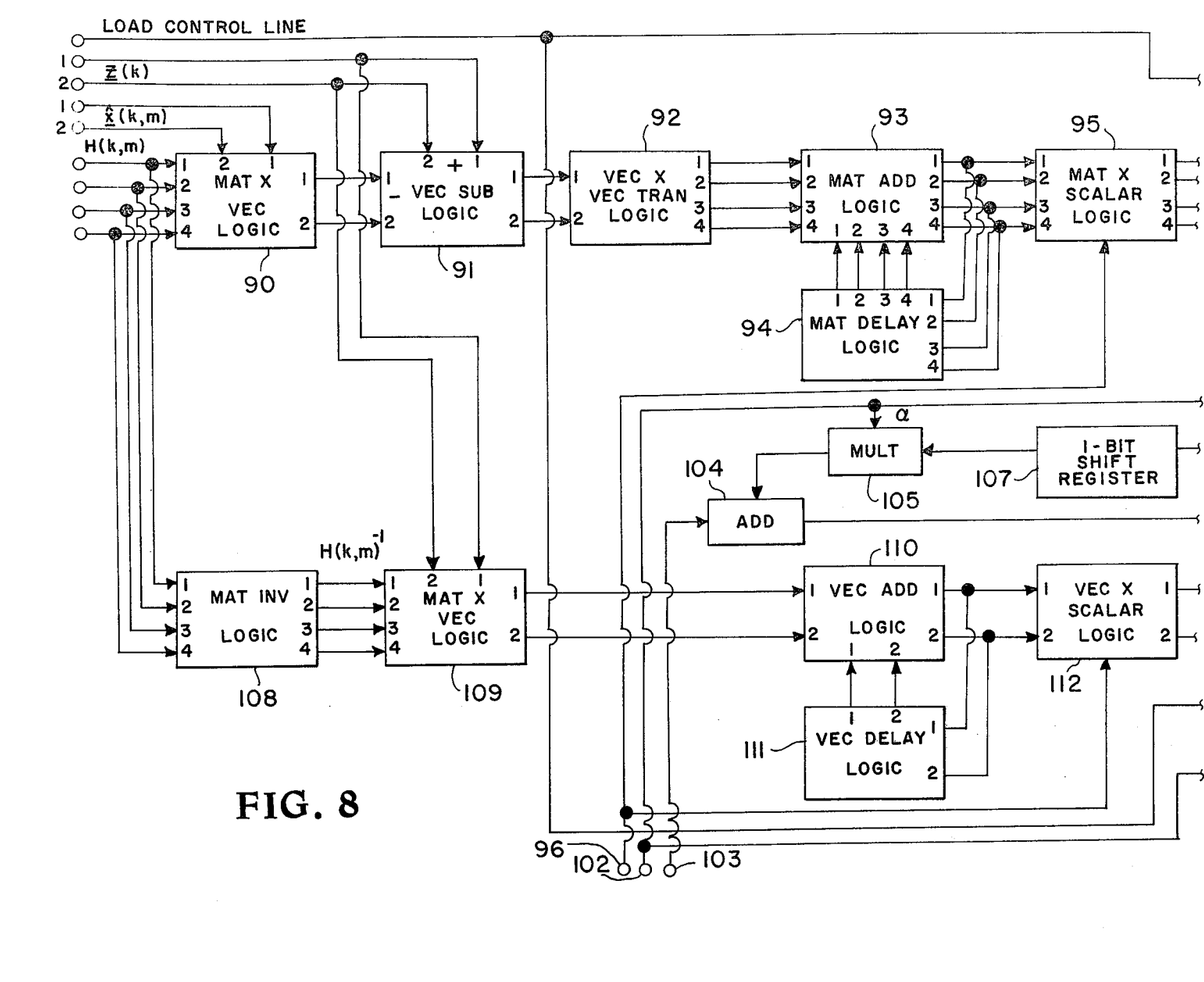
Figure 8A:
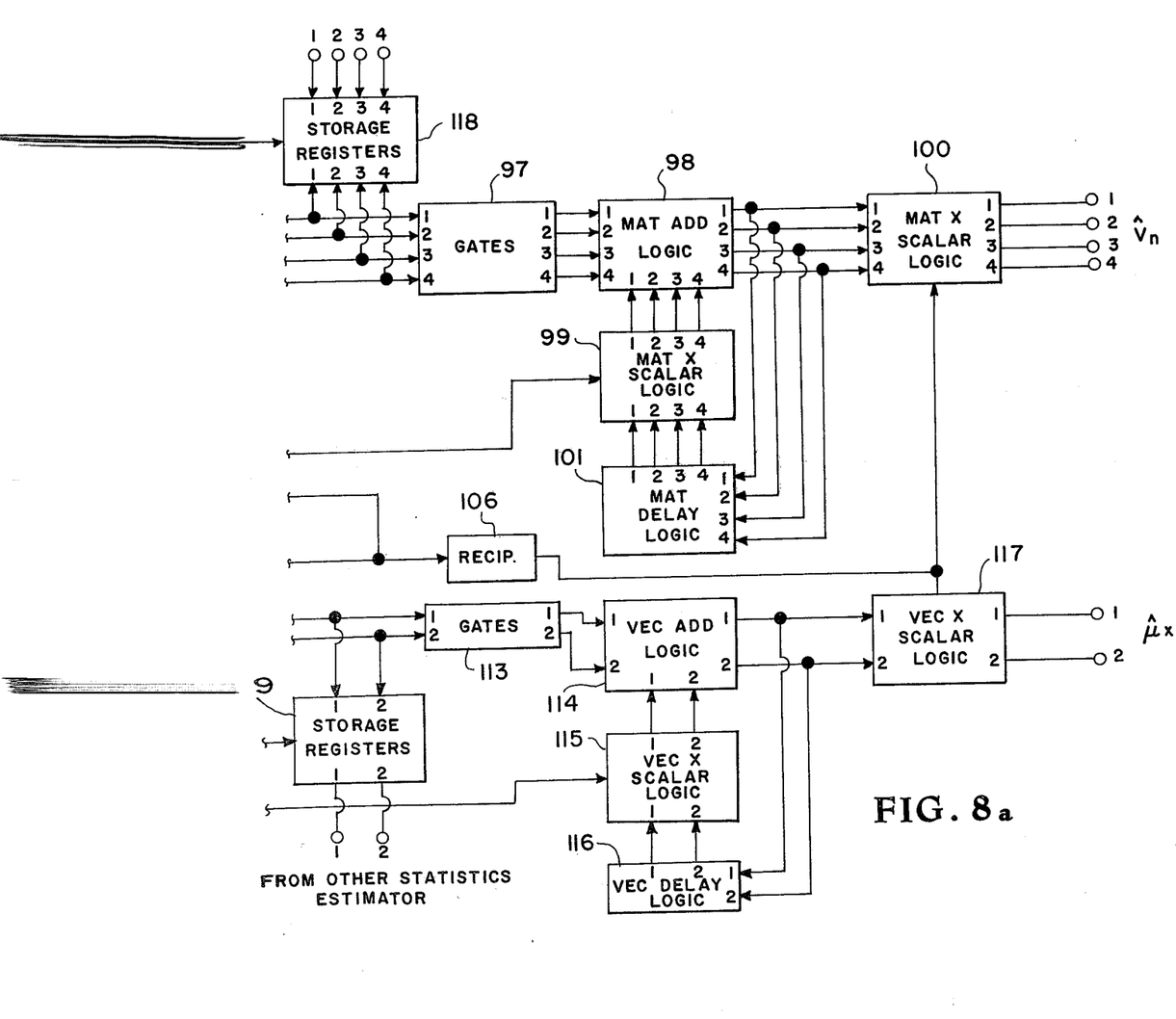

Circuitry suitable for the statistical estimators 28 and 29 in FIG. 2 is disclosed in detail in FIGS. 8 and 8a. The operation of this circuitry is represented by the algorithms 9 and 10. The multipath estimate vector $\hat{x}(k/m)$ from the Kalman filter and the modulation matrix $H(k,m)$ from the modulation generator 32 are multiplied by means of a MAT X VEC logic circuit 90 to produce a vector which is subtracted from the data vector $z(k)$ by VEC SUB logic circuit 91. The resulting vector is applied to a VEC X VEC TRAN logic circuit 92. Logic circuit 92 consists of three multipliers with the 1 input applied to both inputs of the first multiplier to produce the 1 output; with the 2 input applied to both inputs of the second multiplier to produce the 4 output and with the 1 and 2 inputs applied to the third multiplier with the 2 and 3 outputs taken from the output of the third multiplier. The matrix output from logic circuit 92 is added to the matrix from MAT DELAY logic circuit 94 by means of MAT ADD logic circuit 93. The matrix produced by logic circuit 93 in addition to being applied to the MAT DELAY logic circuit 94 is multiplied by the number 1/10 from terminal 96 by means of a MAT X SCALAR logic circuit 95. Logic circuit 95 is four multipliers connected in parallel for multiplying each of the four inputs by the number 1/10. It is to be understood that when a terminal such as terminal 96 is referred to, it could be several terminals in the case when parallel logic is used instead of serial logic. The matrix output from logic circuit 95 which is represented by the last algorithm 10 is applied through gates 97 to a MAT ADD logic circuit 98 where it is added to the matrix at the output of a MAT X SCALAR logic 99. The output of logic circuit 98 is delayed by a MAT DELAY logic circuit 101 and then applied to the MAT X SCALAR logic circuit 99 where it is multipled by 0.998 from terminal 102. The number 1 from terminal 103 is added to the output of a multiplier 105 by means of an adder 104. The output of adder 104 is applied to a one-bit shift register 107 the output of which is applied to multiplier 105 and multiplied by the .998 from terminal 102. The reciprocal of the output of adder 104 is taken by reciprocal device 106 and applied to a MAT X SCALAR logic circuit 100 and a VEC X SCALAR logic circuit 117. The output of MAT ADD logic circuit 98 is multiplied by the output of reciprocal device 106 by means of MAT X SCALAR logic circuit 100 to produce the additive noise matrix output as defined in the first of the algorithms 10.

The modulation matrix is inverted by MAT INV logic circuit 108 and then multiplied by the data vector by means of a MAT X VEC logic circuit 109. The resulting vector is added to the vector from a VEC DELAY logic circuit 111 by means of a VEC ADD logic circuit 110, the output of which is applied to the input of VEC DELAY logic circuit 111. The output of VEC ADD logic circuit 110 is also multiplied by 1/10 by means of a VEC X SCALAR logic circuit 112 to produce the vector represented by the last of the algorithms 9. This vector is applied through gates 113 to a VEC ADD logic circuit 114. The output of VEC ADD logic circuit 114 is applied to VEC DELAY logic circuit 116 and then to a VEC SCALAR logic circuit 115 where it is multiplied by the number 0.998 and then applied to the VEC ADD logic circuit 114. The output of VEC ADD logic circuit 114 is also multiplied by the output of reciprocal device 106 by means of VEC X SCALAR logic circuit 117 to produce the mean vector output $\hat{\mu}_x$ described in the first of the algorithms 9. The values stored in storage registers 118 and 119 are selectively dumped at the time each decision is made by the decision and control circuit into the gates 97 and 113, respectively, of the statistics estimator that is noncorresponding to the decision made.

Figure 10:
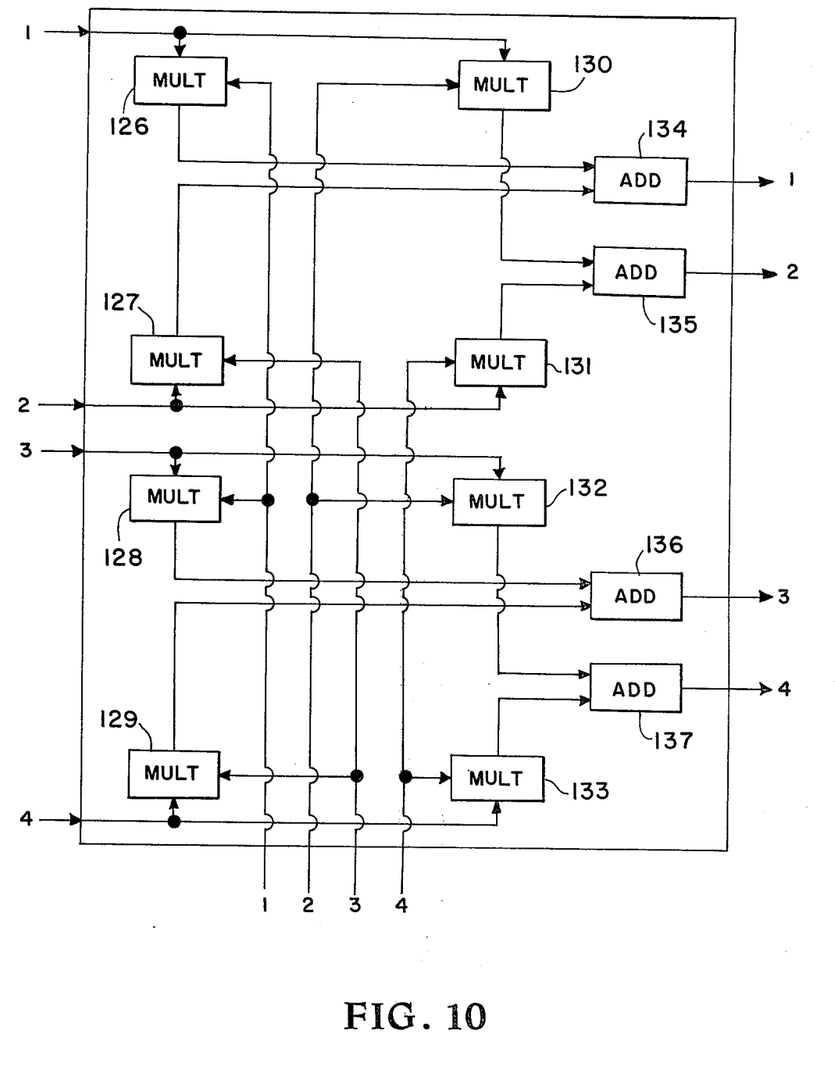
FIG. 10 is a block diagram of a circuit for multiplying a matrix by matrix.

The MAT X VEC logic circuit used in this invention for multiplying a matrix times a vector is disclosed in detail in FIG. 9. Four multipliers 120, 121, 122 and 123 and two adders 124 and 125 are interconnected and connected to the inputs and outputs as shown in the drawing. The MAT X MAT logic circuit used in this invention for matrix multiplication is shown in detail in FIG. 10. Eight multipliers 126–133 and four adders 134–137 are interconnected and connected to the inputs and outputs as shown in FIG. 10 to multiply two matrices together. The MAT INV logic circuit used in this invention for inverting a matrix is shown in detail in FIG. 11. Six multipliers 138–143, a subtractor 144, a reciprocal device 145, and two sign-changing devices 146 and 147 are interconnected and connected to the input and output terminals as shown to invert a matrix.

The advantages of this invention over prior art are that it allows the detection of digital signals in multipath to be performed making maximum use of digital computation. This reduces the physical size and calibration problems of the device, markedly, over the analog or nonsample data versions of the receiver. It is believed that this receiver being fully recursive in operation is the first practical implementation of the digital detector.

An alternate embodiment of the invention allows the Kalman filters to perform the coherent demodulation of the received carrier, rather than having the operation done prior to sampling the data. In this embodiment, the received signal is translated to a low intermediate frequency in the ratio frequency stages of the receiver. The signal is sampled and encoded by the A/D converter. Since there is, internal to the Kalman filter, a product detector, a filter may be allowed to perform the demodulation function.

A second, and very important embodiment of the invention, is obtained in the following manner. After each bit decision, the Kalman gain generator is not re-initialized using the value of $V_x$ which was judged to be correct. Rather, the generator is re-initialized each time to the original value of the initial condition as given in (6). Also, the current value of the noise matrix, $\hat{V}_n$, as computed by the statistics estimator is not used. Rather, a constant previous value of $\hat{V}_n$ is used, so long as the matrix elements do not depart from the current values more than 10 percent. Thus, the gain generator computations need not be performed repetitively every bit period. Rather, the computations may be performed once and then stored for replay during the succeeding bit periods. The computations need be performed again only when the current noise matrix has changed by more than 10 percent from that originally used in the computation.

Even though it is assumed that only two digital symbols (0 and 1) are transmitted by the radio waves, a device can obviously be built in accordance with the algorithms in this disclosure when more than two symbols are transmitted.

What is claimed is:

1. A receiver for radio signals that are modulated with binary information and that have been transmitted through a multipath medium comprising:
   means receiving said radio signals for producing two quadrature components of the signals representing said binary information;
   means receiving said two quadrature components for generating bit timing signals;
   analog-to-digital converter means under the control of said bit timing signals for converting several samples, during each bit period, of said two quadrature components into two sets of digital signals;
   two digital computer means, in one-to-one correspondence with the two digits representing said binary information, with each under the control of said bit timing signals and receiving said two sets of digital signals for computing during each bit period the probability that its corresponding digit was transmitted; and
   comparator means for comparing the outputs of said two computer means and for producing a signal representing the digit whose probability of transmission was the greatest.

2. A receiver according to claim 1 wherein said means for producing two quadrature components of the signals representing said binary information comprises:
   radio frequency stages for producing an intermediate signal;
   carrier reference generator means receiving said intermediate frequency signal for generating a sine wave which is phase-coherent to the carrier wave of the received signal;
   means for phase shifting said sine wave;
   a first analog multiplier receiving said intermediate frequency signal and said sine wave for producing a first signal component; and
   a second analog multiplier receiving said intermediate signal and said phase shifted sine wave for producing a second signal component.

3. A receiver according to claim 1 wherein each of said two digital computer means includes a Kalman filter means responsive to said two sets of digital signals for generating during each of said several sample periods digital signals estimating the multipath perturbations of the received signal under the assumption that the digit corresponding to said Kalman filter means was transmitted and a probability computer means receiving said estimating digital signals for computing during each bit period the probability that its corresponding digit was transmitted.

4. A receiver according to claim 3 wherein said probability computer means includes means for computing during each sample period the probability that its corresponding digit was transmitted and means for multiplying the probabilities of all samples during each bit period together to obtain the probability that its digit was transmitted during the bit period.

5. A receiver according to claim 4 wherein said means for multiplying the probabilities of all samples together includes a multiplier and a shift register with the inputs of said multiplier connected to said means for computing the probabilities during each sample period and to the output of said shift register and with the output of said multiplier connected to the input of said shift register.

6. A receiver according to claim 5 wherein said means for multiplying the probabilities of all samples together includes a gating means under the control of said bit timing signals for gating the output of said multiplier to said comparator means at the end of each bit period.

7. A receiver according to claim 3 wherein each of said Kalman filter means performs the operations defined by the algorithms:
$x(k/m) = x(k/k-1,m) + G(k)[z(k)-z(k/k-1,m)]$
$z(k/k-1,m) = H(k,m)x(k/k-1,m)$
$x(k/k-1,m) = \Phi x(k-1/m) + (1-\Phi)\mu_x$ 8. A receiver according to claim 7 wherein each of said digital computers includes a Kalman gain generator means interconnected with said Kalman filter means and said probability computer means for performing the operations defined by the algorithms:
$G(k) = V_x(k/k-1,m) H^T(k,m)V_z^{-1}(k/k-1,m)$
$V_z(k/k-1,m) = H(k,m) V_x(k/k-1,m)H^T(k,m) + V_n$
$V_x(k\ k-1,m) = \Phi V_x(k-1/m) \Phi^T + \Gamma\Gamma^T$
$V_x(k,m) = [I-G(k)H(k,m)]V_x(k/k-1,m)$ 9. A receiver according to claim 8 wherein each of said probability computer means performs the operations defined by the algorithms:

$$P(m) = p(m) \prod_{k=1}^{10} p(k/m)$$

$$p(k/m) = \frac{1}{2\pi \sqrt{v_z(k/k-1,m)}} \exp\left\{-\frac{1}{2}[z(k)-z(k/k-1,m)]^T V_z^{-1}(k/k-1,m)[z(k)-z(k/k-1,m)]\right\}$$

10. A receiver according to claim 1 wherein each of said two digital computer means includes means responsive to said two sets of digital signals for generating predicting digital signals under the assumption that its corresponding digit was transmitted, a Kalman filter means responsive to said two sets of digital signals and said predicting digital signals for generating digital signals that represents the error that said filter predicts it will make at each of said samples, and probability computer means responsive to said predicting digital signals and said digital signals that represents the error that said filter predicts it will make at each of said samples, for computing during each bit period the probability that its corresponding digit was transmitted.

11. A receiver according to claim 1 wherein each of said two digital computer means includes means for computing during each sample period the probability that its corresponding digit was transmitted and means for multiplying the probabilities of all samples during each bit period together to obtain the probability that its digit was transmitted during the bit period.

12. A receiver according to claim 11 wherein said means for multiplying the probabilities of all samples together includes a multiplier and a shift register with the inputs of said multiplier connected to said means for computing the probabilities during each sample period and to the output of said shift register and with the output of said multiplier connected to the input of said shift register.

* * * * *